US012636979B2

(12) United States Patent
Kang et al.

(10) Patent No.:    US 12,636,979 B2
(45) Date of Patent:    May 26, 2026

(54) SEATBACK LOCKING DEVICE

(71) Applicant: HYUNDAI TRANSYS INC., Seosan-si (KR)

(72) Inventors: Seok In Kang, Hwaseong-si (KR); Hyeon Woo Jung, Hwaseong-si (KR); Su Bin Kim, Hwaseong-si (KR); Ryang Oh Park, Hwaseong-si (KR); Sung Lak Seo, Hwaseong-si (KR); Ji Ho Yang, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 113 days.

(21) Appl. No.: 18/882,106

(22) Filed: Sep. 11, 2024

(65) Prior Publication Data

US 2025/0100428 A1    Mar. 27, 2025

(30) Foreign Application Priority Data

Sep. 27, 2023    (KR) ......................... 10-2023-0130643

(51) Int. Cl.
B60N 2/22    (2006.01)
(52) U.S. Cl.
CPC .................................. B60N 2/2245 (2013.01)
(58) Field of Classification Search
CPC .............................. B60N 2/2245; B60N 2/366
See application file for complete search history.

(56) References Cited

U.S. PATENT DOCUMENTS

2020/0086772 A1* 3/2020 Madhu .................... B60N 2/366
2024/0217398 A1* 7/2024 Choe .................... B60N 2/2245

FOREIGN PATENT DOCUMENTS

| CN | 108544991 A | * | 9/2018 | ........... B60N 2/2245 |
| CN | 115465164 A | * | 12/2022 | ........... B60N 2/2245 |
| FR | 3034723 A1 | * | 10/2016 | ............. B60N 2/366 |
| JP | 2021-175907 A | | 11/2021 | |
| KR | 10-2008-0050768 A | | 6/2008 | |
| KR | 20090055904 A | * | 6/2009 | .............. B60N 2/20 |
| KR | 10-2016-0082781 A | | 7/2016 | |
| KR | 20160082781 A | * | 7/2016 | ........... B60N 2/0806 |
| KR | 10-2017-0076211 A | | 7/2017 | |

OTHER PUBLICATIONS

Request for the Submission of an Opinion in Korean Application No. 10-2023-0130643 dated Apr. 18, 2025.
Decision to Grant dated Dec. 24, 2025 from Korean Application No. 10-2023-0130643.

* cited by examiner

*Primary Examiner* — Eric J Kurilla

(74) *Attorney, Agent, or Firm* — Quantum Patent Law Firm; Seongyoune Kang

(57)    ABSTRACT

A seatback locking device may include a locking housing coupled to a seatback, the locking housing having one open side defined as a housing internal space, a rotation cap inserted into the housing internal space and rotatably coupled to the locking housing, a stopper configured to be movable along a guide defined in the locking housing so as to be locked to or unlocked from a hook bracket disposed on a vehicle body, and a cable connected to one end of the stopper so as to rotate the stopper, wherein the stopper is rotated about an axis between both ends of the stopper by movement of the cable or rotation of the rotation cap so as to contact the hook bracket or the rotation cap.

16 Claims, 12 Drawing Sheets

FIG. 2

SEATBACK LOCKING DEVICE

CROSS-REFERENCE TO RELATED APPLICATION

This application claims priority, under 35 U.S.C. § 119(a), to Korean Patent Application No. 10-2023-0130643, filed on Sep. 27, 2023, the entire contents of which are incorporated herein by reference.

BACKGROUND

(a) Technical Field

The present disclosure relates to a seatback locking device configured to engage a seatback with a vehicle body.

(b) Background Art

A seat mounted in a vehicle may perform a function of sliding a seat cushion forwards or folding or unfolding a seatback. When not folded, the seatback may remain coupled to a vehicle body. A user operates a lever to release locking between the seatback and the vehicle body, and a latch connecting the seatback to the vehicle body may be released by operation of the lever. When a locked state between the seatback and the vehicle body is released, the user may fold the seatback. That is, folding of the seatback is not performed in the locked state between the seatback and the vehicle body.

Meanwhile, unfolding of the seatback is performed in a state in which the seatback is folded, and the seatback is connected to the vehicle body after the seatback is unfolded. In this case, locking between the seatback and the vehicle body may be performed only after the seat cushion slides to the rearmost position thereof.

Additionally, if there is no separate space at the rear side of the second row seats, for convenience of a passenger, the seat cushion may slide forwards so as to recline the seatback.

Furthermore, the seatback has a latch disposed on the rear side thereof and configured to connect the seatback to the vehicle body. In this case, there is a problem in that foreign substances may flow into the seatback through the latch.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a seatback locking device capable of performing coupling between a seatback and a vehicle body regardless of the position of a seat cushion.

It is another object of the present disclosure to provide a seatback locking device capable of performing coupling between a seatback and a vehicle body regardless of sliding of a seat cushion.

It is a further object of the present disclosure to provide a seatback locking device capable of preventing foreign substances from flowing into a seatback.

In one aspect, the present disclosure provides a seatback locking device including a locking housing coupled to a seatback, the locking housing having one open side defined as a housing internal space, a rotation cap inserted into the housing internal space and rotatably coupled to the locking housing, the rotation cap being capable of assuming a first position and a second position depending on rotation, a stopper configured to be movable along a guide defined in the locking housing so as to be locked to or unlocked from a hook bracket disposed on a vehicle body, the stopper configured to contact the rotation cap when the rotation cap is at the first position and to contact the hook bracket when the rotation cap is in the second position, and a cable connected to one end of the stopper so as to move the stopper, wherein the stopper is configured to be rotated about an axis extending between both ends of the stopper by movement of the cable or rotation of the rotation cap so as to contact the hook bracket or the rotation cap.

In a preferred embodiment, the both ends of the stopper may be rotatably connected to the locking housing or a main bracket disposed on the locking housing.

In another preferred embodiment, the stopper may be divided into a first region inserted into the guide and a second region located outside the guide and the stopper may have a curved shape connecting the first region and the second region.

In still another preferred embodiment, when the seatback is fixed to the vehicle body, the hook bracket is coupled to the stopper in a state of being inserted into a cap internal space of the rotation cap assuming the second position, wherein the cap internal space may be defined by a convex shape of the rotation cap protruding toward the locking housing.

In yet another preferred embodiment, in the second position of the rotation cap, the rotation cap may be located between the locking housing and the stopper located within the guide, and may be disposed spaced apart from the stopper.

In still yet another preferred embodiment, the stopper may be configured to be moved outward within the guide and become unlocked from the hook bracket by pulling the cable, the hook bracket may be configured to be moved away from the rotation cap when the seatback is folded, thereby allowing the rotation cap to be rotatably moved to the first position, and the first position corresponds to a closed position of the rotation cap which is a position blocking the housing internal space of the locking housing.

In a further preferred embodiment, the stopper may be configured to be moved inward within the guide and rest on the rotation cap assuming the first position after the pulling of the cable is released.

In another further preferred embodiment, a part of the stopper located within the guide may be configured to rest on the rotation cap assuming the first position in a folded state of the seatback.

In still another further preferred embodiment, when the hook bracket is inserted into a cap internal space of the rotation cap by unfolding of the seatback, the rotation cap may be configured to be rotated by the hook bracket so as to move the stopper outward within the guide, the cap internal space defined by a convex shape of the rotation cap protruding toward the locking housing.

In yet another further preferred embodiment, the stopper rotated by the rotation cap may be configured to be moved to an upper portion of the guide, and the stopper may be configured to pass over the rotation cap and to contact the hook bracket, thereby fixing the seatback to the vehicle body.

In still yet another further preferred embodiment, the stopper may is biased by a first spring to maintain, a position in which the stopper and the hook bracket are coupled, the first spring being connected to the stopper and configured to pull the stopper inward within the guide.

In a still further preferred embodiment, he other end o the cable may be opposite the one end and may be connected to the first spring.

In a yet further preferred embodiment, the rotation cap and the locking housing may be connected to each other by a rotation pin, the rotation pin may be connected to a second spring at an outer side thereof and configured to maintain the first position of the rotation cap, and the rotation cap may be configured to block the housing internal space of the locking housing at the first position.

In a still yet preferred embodiment, the rotation cap may include a lower end connected to a lower end of the locking housing, the stopper located within the guide may be configured to be moved outward within the guide by pulling of the cable, and each of the lower end of the rotation cap and the lower end of the locking housing may mean a portion adjacent to the seat cushion.

In yet another preferred embodiment, the stopper and the hook bracket may remain in a locked state even if the seat cushion slides.

In still yet another preferred embodiment, the locking housing may include a first housing and a second housing, wherein the first housing may define the housing internal space, and the second housing may be connected to the first housing and may have a flat plate structure partially open to expose the housing internal space, and the rotation cap may block the housing internal space exposed by the second housing in an unlocked state between the stopper and the hook bracket.

Other aspects and preferred embodiments of the disclosure are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 2 is a perspective view showing the seatback locking device according to the embodiment of the present disclosure;

Figure 1:
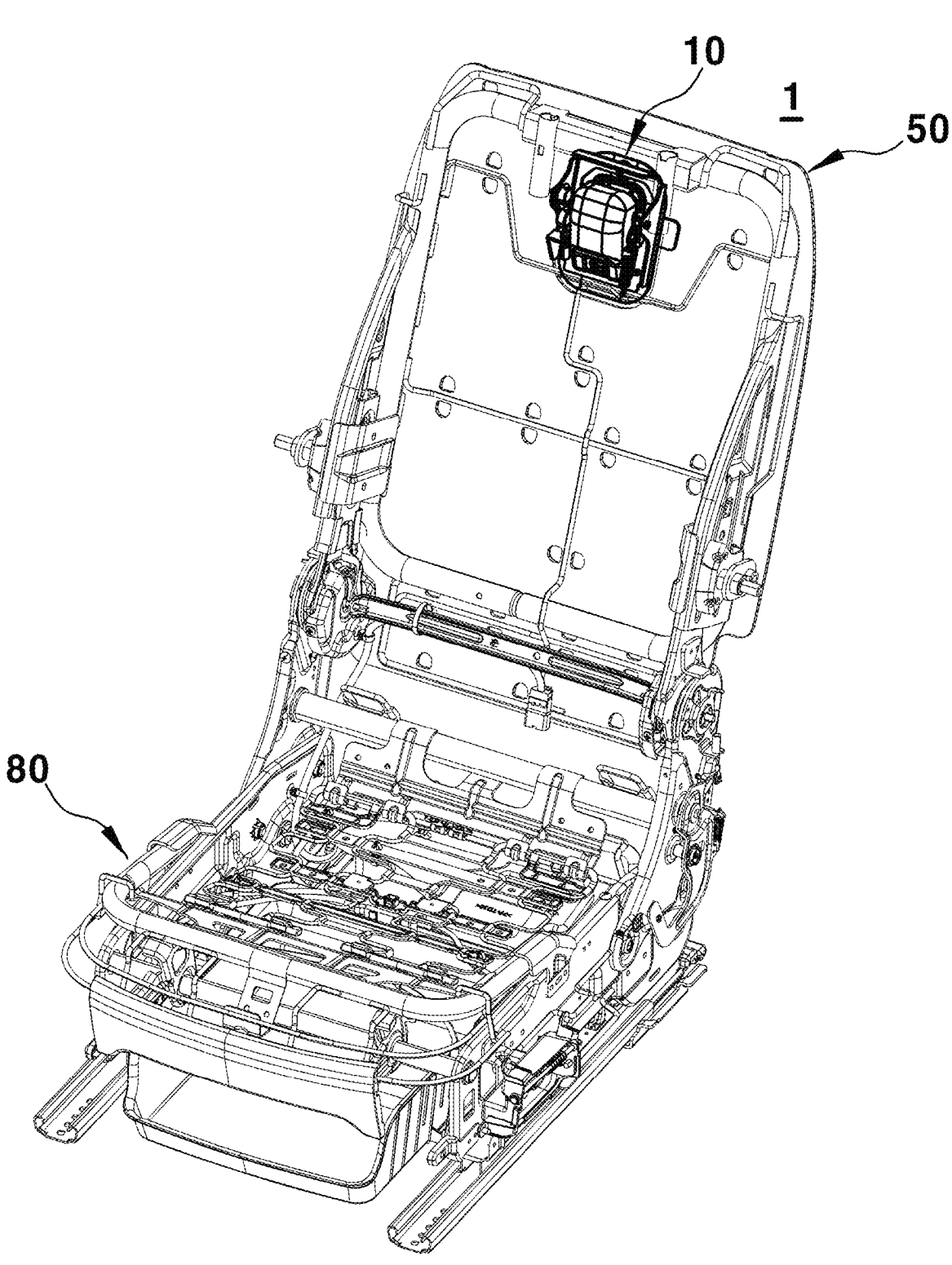
FIG. 1 is a view showing a seat in which a seatback locking device according to an embodiment of the present disclosure is installed.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. Advantages and features of the present disclosure and a method of achieving the same will become more apparent with reference to the embodiments described below in detail and the accompanying drawings. However, the present disclosure is not limited by the embodiments disclosed below, and may be implemented in various forms. The embodiments are provided to ensure that the disclosure of the present disclosure is complete, and to fully inform the scope of the disclosure to those skilled in the art to which the present disclosure pertains, and the present disclosure is only defined by the scope of the claims. In the drawings, the same reference numerals refer to the same or equivalent components of the present disclosure throughout the specification.

Meanwhile, in this specification, terms such as "first" and "second" are used to describe various components having the same names, and the terms are used only for the purpose of distinguishing one component from other components. The components are not limited by the terms in the following description.

The present disclosure has been described in detail with reference to preferred embodiments thereof, and the present disclosure may be used in various other combinations, modifications, and environments. That is, it will be appreciated by those skilled in the art that changes may be made in these embodiments without departing from the principles and spirit of the disclosure, the scope of which is defined in the appended claims and equivalents thereto. The embodiments describe the best mode to implement the technical idea of the present disclosure, and various changes required in specific application fields and uses of the present disclosure are also possible. Accordingly, the detailed description of the present disclosure is not intended to limit the present disclosure to the disclosed embodiments. Additionally, the scope of the appended claims should be construed as including other embodiments as well.

FIG. 1 is a view showing a seat in which a seatback locking device according to an embodiment of the present disclosure is installed.

Referring to FIG. 1, a seat 1 mounted in a vehicle may include a seatback 50 and a seat cushion 80. A seatback locking device 10 may be installed in the seatback 50. Specifically, the seatback locking device 10 may be installed on a seatback frame constituting the seatback 50. The seatback locking device 10 is configured to couple a vehicle body to the seat 1. Here, in order to fold the seatback 50, a coupled state between the seatback locking device 10 and the vehicle body needs to be released. The seatback locking device 10 is disposed in the seatback 50, and a part of the seatback locking device 10 may be exposed at the rear side of the seatback 50. When only a part of the seatback locking device 10 is exposed to the outside of the seatback 50, foreign substances may be prevented from flowing into the seatback locking device 10. In addition, when the seatback 50 is folded, the seatback locking device 10 is configured to prevent an internal structure of the seatback locking device 10 from being exposed to the outside, thereby making it possible to prevent foreign substances from flowing into the seatback locking device 10.

Figure 2:
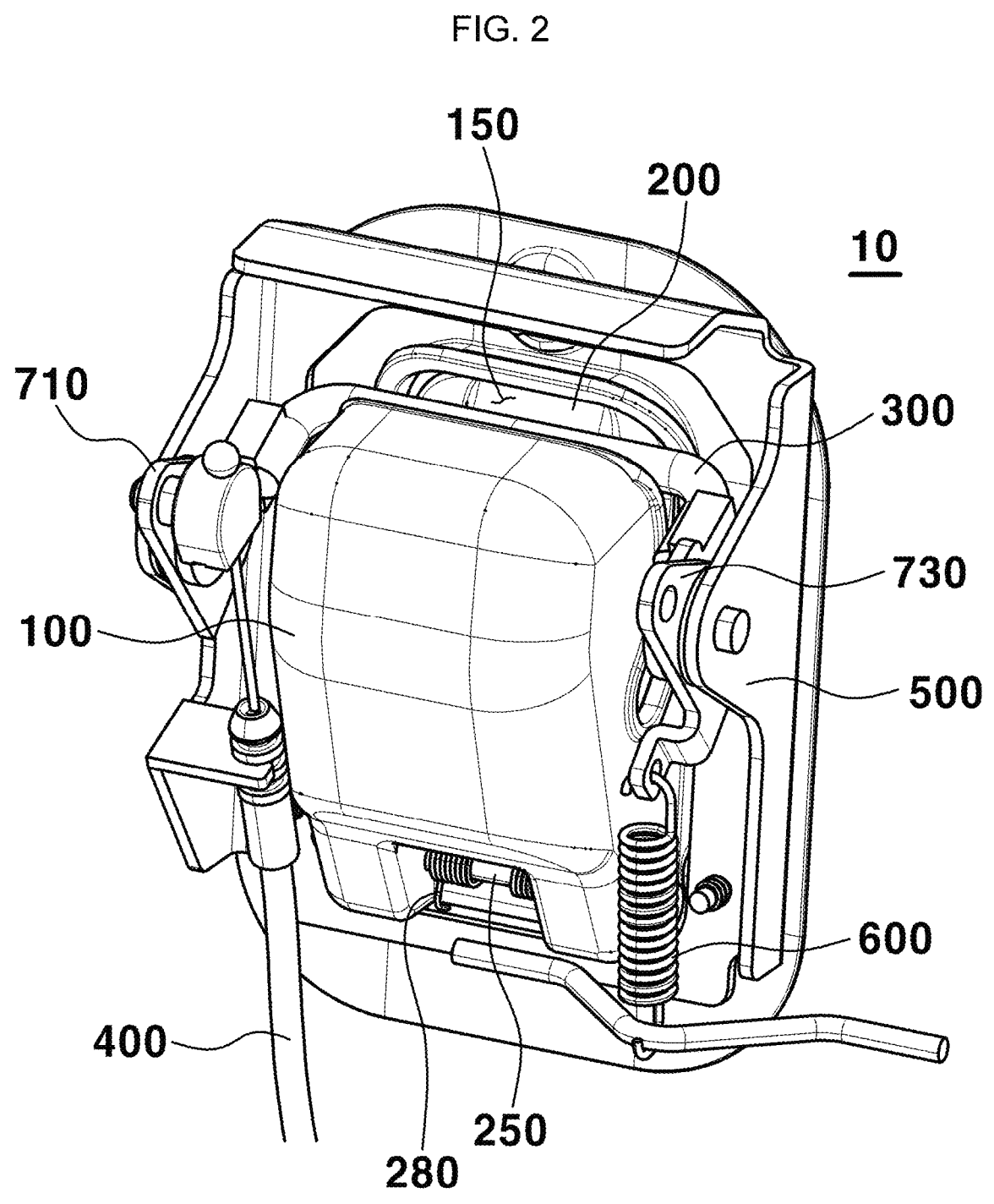
Figure 3:
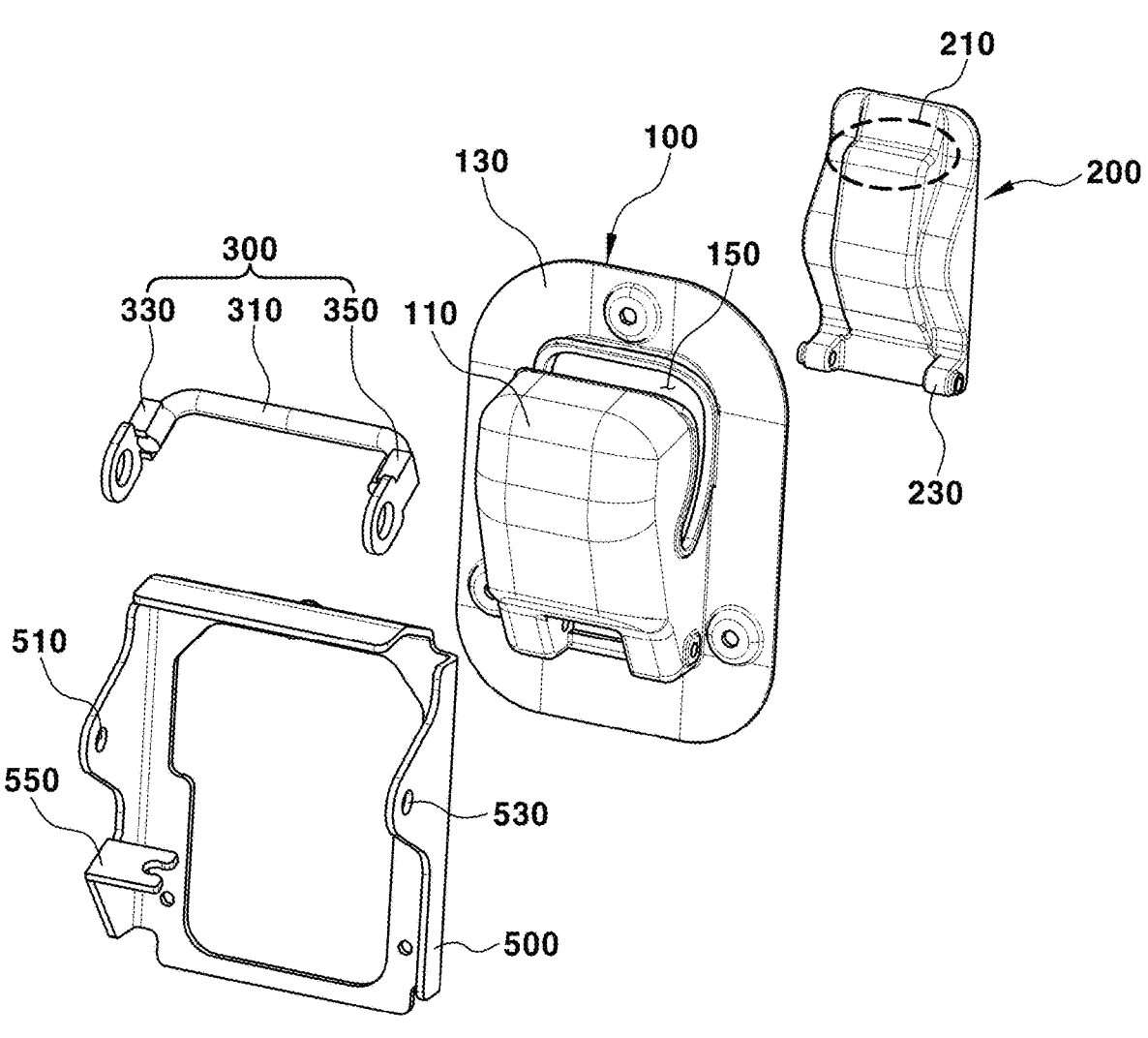
FIG. 3 is an exploded perspective view showing the seatback locking device according to the embodiment of the present disclosure.
Figure 4:
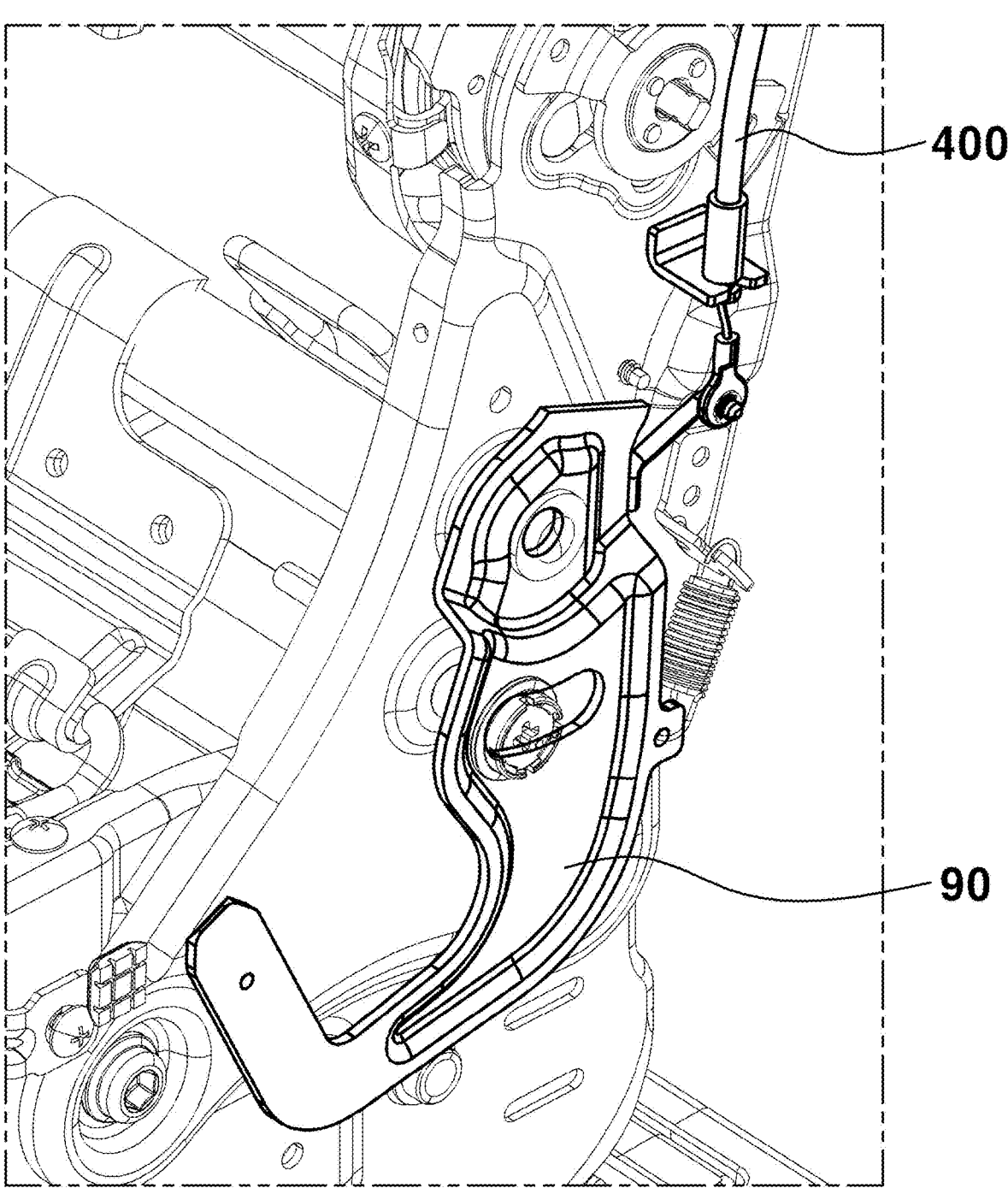
FIG. 4 is a view showing a lever configured to operate the seatback locking device according to the embodiment of the present disclosure.

FIG. 2 is a perspective view showing the seatback locking device according to the embodiment of the present disclosure, FIG. 3 is an exploded perspective view showing the seatback locking device according to the embodiment of the present disclosure, and FIG. 4 is a view showing a lever configured to operate the seatback locking device according to the embodiment of the present disclosure.

Referring to FIGS. 1 to 4, the seatback locking device 10 may include a locking housing 100, a rotation cap 200, a stopper 300, a cable 400, a main bracket 500, and a first spring 600. The seatback locking device 10 may be operated by a user pulling a lever 90. When the user pulls the lever 90, the cable 400 connected to the lever 90 may be pulled by rotation of the lever 90 downwards relative to a direction in which the seat 1 is installed. When the cable 400 is pulled downwards, the stopper 300 is rotated to release locking between the stopper 300 and the vehicle body.

The locking housing 100 may include a first housing 110 having one open side defined as a housing internal space, and a second housing 130 connected to the first housing 110. The first housing 110 may have a convex shape that protrudes from the second housing 130. The second housing 130 may be partially open to expose the housing internal space and may have a flat plate structure. The locking housing 100 may have a guide 150 disposed therein and configured to define a space allowing a part of the stopper 300 to be inserted thereinto and the stopper 300 to be movable therein. The guide 150 is a type of slit and may refer to an open space defined in the first housing 110. The guide 150 may extend from the upper surface of the first housing 110 toward the side surface of the first housing 110. The guide 150 may extend from the upper portion of the first housing 110 toward the lower portion thereof. In other words, the guide 150 may extend from the upper portion of the locking housing 100 toward the lower portion thereof, and the upper portion of the locking housing 100 or the upper portion of the guide 150 may refer to the upper portion relative to a direction in which the seatback locking device 10 is mounted in the seatback 50.

The rotation cap 200 may be inserted into the housing internal space of the locking housing 100 and may be rotatably connected to the locking housing 100. Specifically, the rotation cap 200 may be inserted into the housing internal space of the first housing 110 and may be connected to the lower end of the first housing 110. That is, the lower end of the rotation cap 200 may be connected to the lower end of the locking housing 100. The lower portion of the guide 150 may refer to a direction approaching a location at which the rotation cap 200 and the locking housing 100 are connected to each other. The rotation cap 200 may have a connection portion 230 provided at the lower end thereof and connected to the locking housing 100. Further, the rotation cap 200 may have a curved surface 210 provided at the upper end thereof and configured to contact the stopper 300.

The connection portion 230 of the rotation cap 200 and the lower end of the locking housing 100 may be connected to each other by a rotation pin 250. The rotation pin 250 may be inserted into a hole defined in the connection portion 230 of the rotation cap 200 and a hole defined in the lower end of the locking housing 100. The rotation cap 200 is rotatable relative to the lower end of the locking housing 100 by the rotation pin 250. The rotation cap 200 may be capable of assuming a first position and a second position depending on rotation. A second spring 280 may be provided on the outer side of the rotation pin 250. The second spring 280 may apply elastic force to the rotation cap 200 so that the rotation cap 200 is moved to the closed position thereof. The closed position of the rotation cap 200 may mean a position at which the rotation cap 200 blocks the housing internal space of the locking housing 100.

The stopper 300 may be rotated by operation of the cable 400. The stopper 300 may be configured to contact the rotation cap 200 when the rotation cap 200 is at the first position and to contact the hook bracket when the rotation cap 200 is in the second position. The stopper 300 may include a first region 310 inserted into the guide 150 defined in the first housing 110 of the locking housing 100 and second regions 330 and 350 respectively provided at both ends of the first region 310. The stopper 300 may have a curved shape connecting the first region 310 and the second region 330 and 350. The second regions 330 and 350 may be located at the outside of the guide 150. The first region 310 is coupled to the vehicle body and has a straight bar shape. The second regions 330 and 350 are regions curved relative to the first region 310 and are connected to the main bracket 500. The stopper 300 may be rotated around the second regions 330 and 350 connected to the main bracket 500. When the stopper 300 is rotated, the first region 310 is movable between the lower portion and the upper portion of the guide 150. When the first region 310 of the stopper 300 is located at the uppermost portion of the guide 150, the rotation cap 200 and the stopper 300 may not interfere with each other, and the rotation cap 200 may be rotated without contacting the stopper 300. When the first region 310 of the stopper 300 is located at the lowermost portion of the guide 150, the stopper 300 may be coupled to the vehicle body.

The cable 400 may be connected to the stopper 300. Specifically, the cable 400 may be connected to one of the second regions 330 and 350 of the stopper 300, and the first spring 600 may be connected to the other one of the second regions 330 and 350. For example, the cable 400 may be connected to the second region 330, and the first spring 600 may be connected to the second region 350. When the cable 400 is pulled downwards relative to the arrangement direction of the seat 1, the stopper 300 may be moved to the upper portion of the guide 150. When pulling of the cable 400 is released, the stopper 300 may be moved to the lower portion of the guide 150.

The stopper 300 is rotated about an axis between the both ends of the stopper 300 by movement of the cable 400 or rotation of the rotation cap 200, thereby contacting a hook bracket provided on the vehicle body or contacting the rotation cap 200. When the cable 400 is operated in a state in which coupling between the stopper 300 and the hook bracket is maintained, the stopper 300 is rotated to release coupling between the stopper 300 and the hook bracket. Thereafter, the rotated stopper 300 may be moved on the curved surface 210 of the rotation cap 200. When the seatback 50 is unfolded to perform coupling between the stopper 300 and the hook bracket, the hook bracket pushes the rotation cap 200 toward the locking housing 100 so that the stopper 300 is rotatable. Then, the stopper 300 is moved within the guide 150 and is connected to the hook bracket, thereby allowing the seatback locking device 10 and the vehicle body to be coupled to each other.

The main bracket 500 may be located on the locking housing 100. The locking housing 100 and the main bracket 500 may be coupled to each other through bolts. The main bracket 500 may be connected to the stopper 300 through sub-brackets 710 and 730. The both ends of the stopper 300 may be rotatably connected to the main bracket 500. Here, the both ends of the stopper 300 may be hinged and rotated by being coupled to a part of the locking housing 100 instead of being coupled to the main bracket 500. The sub-brackets 710 and 730 may include the first sub-bracket 710 connected to the second region 330 of the stopper 300 and the cable 400, and the second sub-bracket 730 connected to the second region 350 of the stopper 300. A first hole 510 of the main bracket 500, the first sub-bracket 710, the second region 330 of the stopper 300, and the cable 400 may be connected to each other through bolts. A second hole 530 of the main bracket 500, the second sub-bracket 730, and the second area 350 of the stopper 300 may be connected to each other through bolts. The main bracket 500 may be provided with a protrusion 550 configured to determine the position of the cable 400, and the cable 400 may be moved only in the upward-and-downward direction relative to the arrangement direction of the seat 1 in a state of being inserted into a groove formed in the protrusion 550.

The first spring 600 may serve to fix the position of the stopper 300 in a state in which the stopper 300 is located at the lower portion of the guide 150 and is coupled to the vehicle body. The first spring 600 may be directly connected to the stopper 300 or may be connected to the second sub-bracket 730 connected to the stopper 300. The first spring 600 may pull the stopper 300 or the second sub-bracket 730 downwards relative to the arrangement direction of the seat 1. Accordingly, rotation of the stopper 300 or the second sub-bracket 730 may be restricted. In other words, rotation of the stopper 300 toward the upper portion of the guide 150 may be restricted by the first spring 600. One end of the first spring 600 may be connected to the stopper 300 or the second sub-bracket 730 connected to the stopper 300, and the other end of the first spring 600 may be connected to the main bracket 500 or the frame of the seatback 50. The position of the first spring 600 may be fixed.

According to the embodiment of the present disclosure, the stopper 300 connected to the vehicle body may be rotated by a user manipulating the lever 90, thereby releasing a locked state between the seatback locking device 10 and the vehicle body. Accordingly, locking and unlocking between the seatback locking device 10 and the vehicle body may be implemented using simplified components.

According to the embodiment of the present disclosure, the seatback locking device 10 includes the first spring 600 configured to fix the position of the stopper 300 to be locked to or unlocked from the vehicle body to the lower portion of the guide 150. In a state in which the seatback locking device 10 and the vehicle body are coupled to each other, it is possible to maintain locking between the seatback locking device 10 and the vehicle body regardless of a change in the angle of the seatback 50 or sliding of the seat cushion 80.

Figure 5:
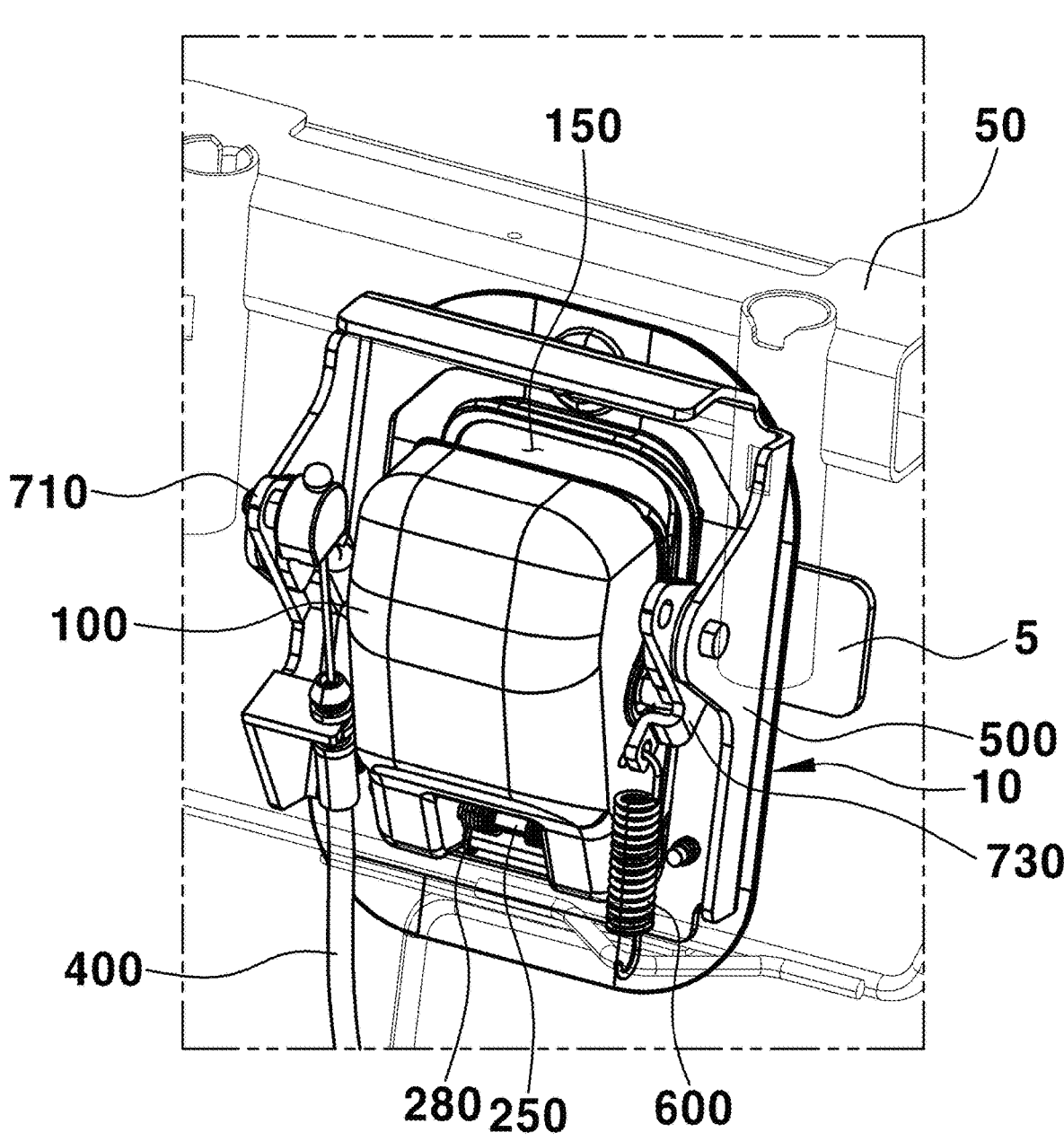
FIG. 5 is a view showing a state in which the seatback locking device according to the embodiment of the present disclosure is connected to a hook bracket installed on a vehicle body.
Figure 6:
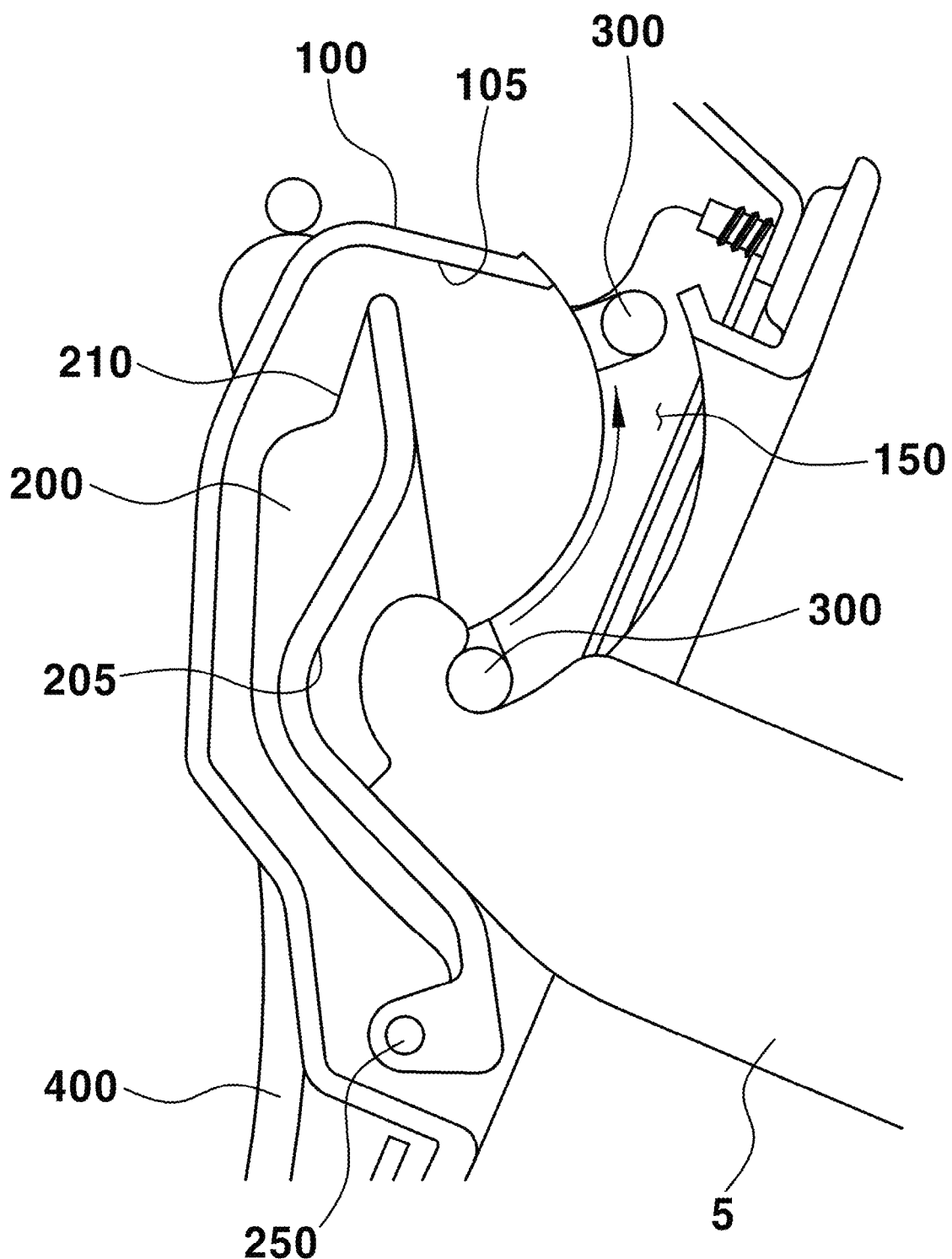
FIG. 6 is a cross-sectional view showing a state in which the seatback locking device according to the embodiment of the present disclosure is unlocked by operation of the lever.

FIG. 5 is a view showing a state in which the seatback locking device according to the embodiment of the present disclosure is connected to the hook bracket installed on the vehicle body, and FIG. 6 is a cross-sectional view showing a state in which the seatback locking device according to the embodiment of the present disclosure is unlocked by operation of the lever.

Referring to FIGS. 1, 5, and 6, folding of the seatback 50 may be restricted in a state in which the seatback locking device 10 and a hook bracket 5 installed on the vehicle body are coupled to each other. In a state in which the seatback locking device 10 is locked, the hook bracket 5 may be coupled to the stopper 300. Specifically, the hook bracket 5 may be coupled to the first area of the stopper 300 located within the guide 150. In this case, the rotation cap 200 may be rotated toward a housing internal space 105 of the locking housing 100, and the hook bracket 5 may be inserted into a cap internal space 205 of the rotation cap 200, in which the cap internal space 205 is defined by a convex shape of the rotation cap 200 protruding toward the locking housing 100. In the second position of the rotation cap 200, the rotation cap 200 may be located between the locking housing 100 and the stopper 300 located within the guide 150. Since the rotation cap 200 is disposed at a location spaced apart from the stopper 300, the rotation cap 200 and the stopper 300 may not contact each other. The stopper 300 may be biased by the first spring 600 to maintain a position in which the stopper 300 and the hook bracket are coupled, the first spring 600 may be connected to the stopper 300 and configured to pull the stopper 300 inward within the guide 150.

When the cable 400 is pulled by user manipulation, the stopper 300 may be rotated toward the upper portion of the guide 150, and locking between the stopper 300 and the hook bracket 5 may be released by rotation of the stopper 300. The stopper 300 may be configured to be moved outward within the guide 150 by pulling the cable 400. The upper portion of the guide 150 may refer to a direction away from a location at which the rotation cap 200 and the locking housing 100 are couped to each other, and the lower portion of the guide 150 may refer to a direction approaching the location at which the rotation cap 200 and the locking housing 100 are coupled to each other.

Figure 7:
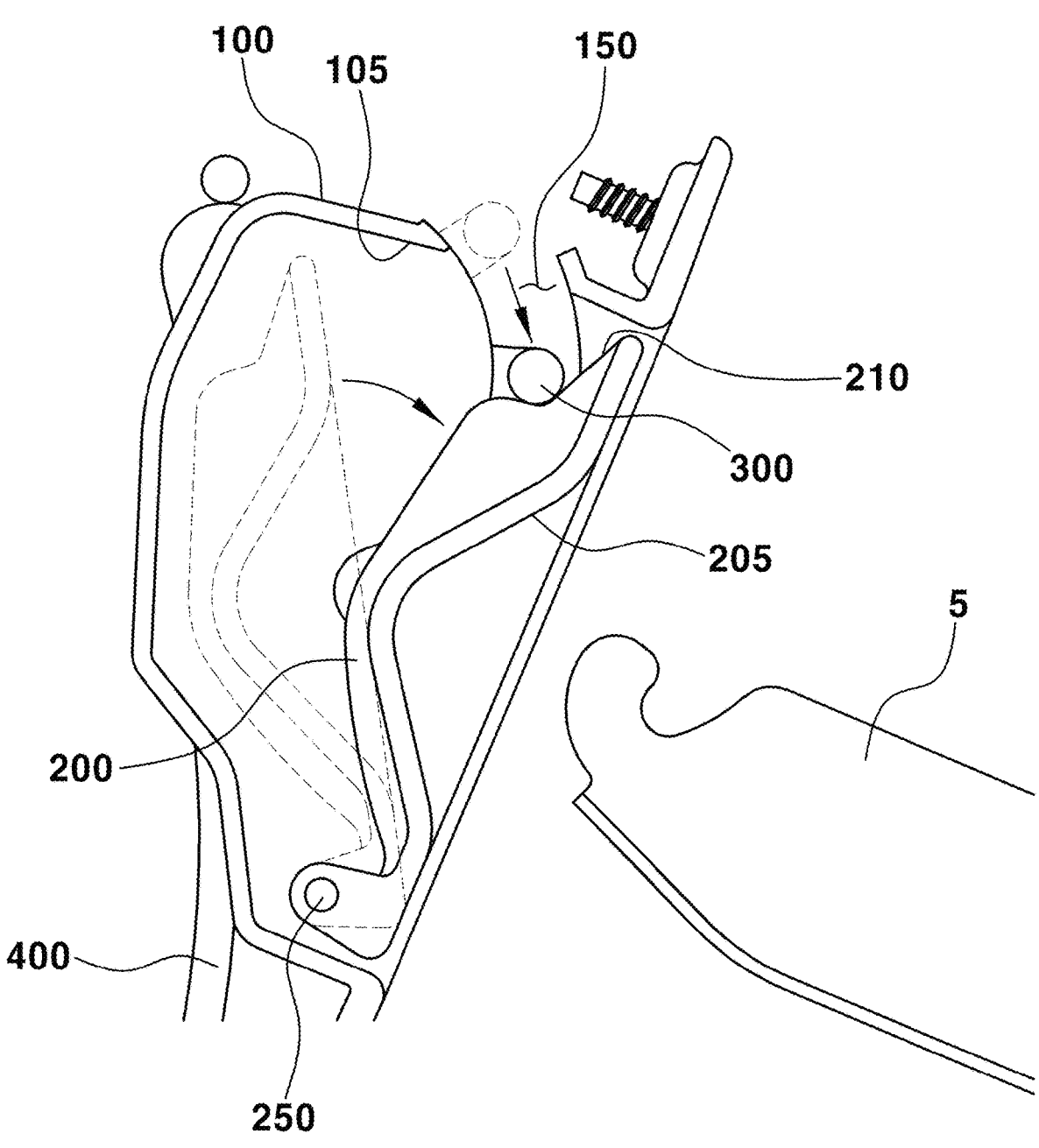
FIG. 7 is a cross-sectional view showing a state in which a rotation cap of the seatback locking device according to the embodiment of the present disclosure is moved to a closed position thereof by folding of the seatback.
Figure 8:
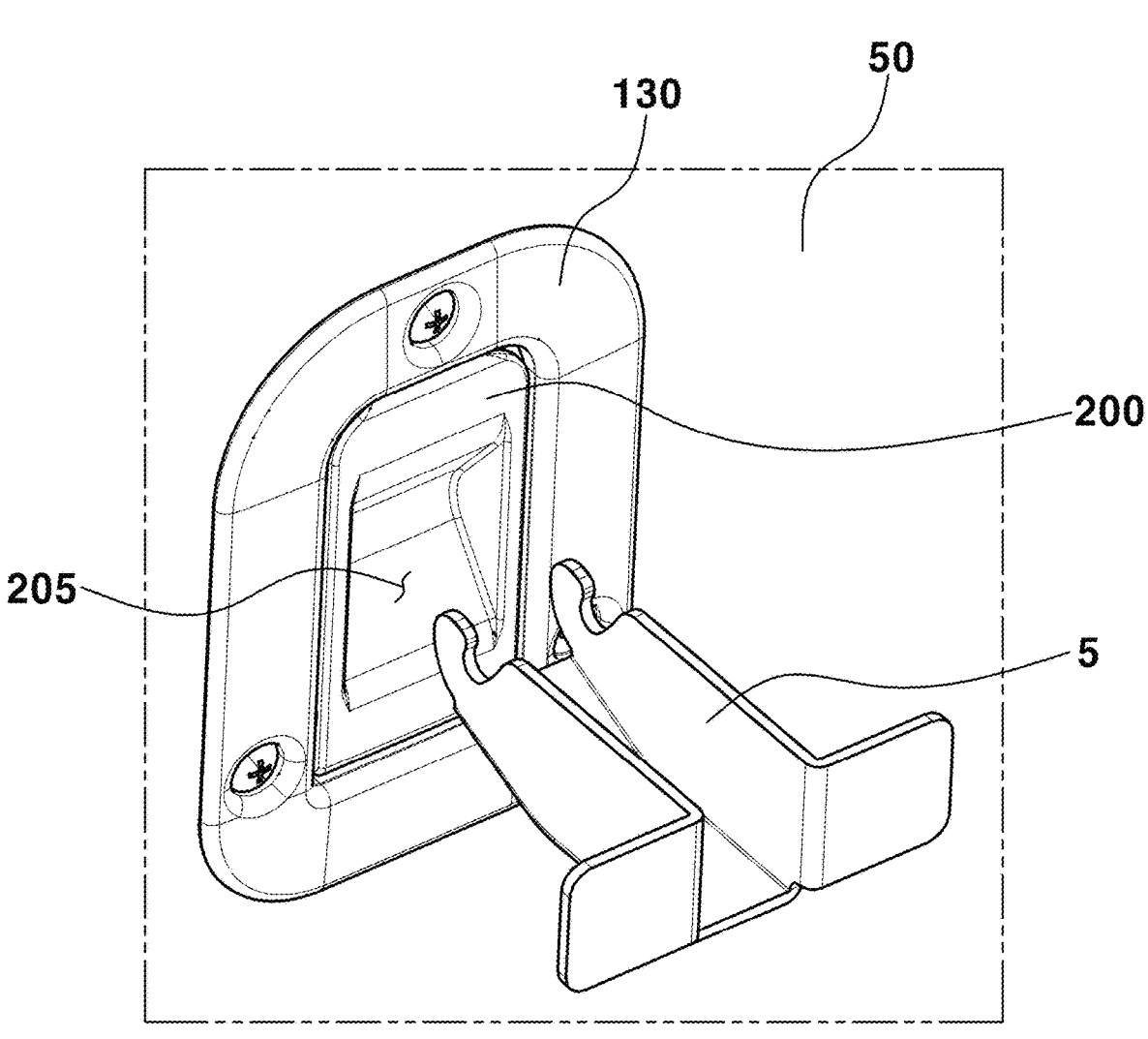
FIG. 8 is a view showing the position of the rotation cap in an unlocked state of the seatback locking device according to the embodiment of the present disclosure.

FIG. 7 is a cross-sectional view showing a state in which the rotation cap of the seatback locking device according to the embodiment of the present disclosure is moved to the closed position thereof by folding of the seatback, FIG. 8 is a view showing the position of the rotation cap in an unlocked state of the seatback locking device according to the embodiment of the present disclosure.

Referring to FIGS. 5, 7 and 8, after the cable 400 is pulled by operation of a user, the seatback 50 may be folded. In this process, when the hook bracket 5 and the rotation cap 200 are moved apart from each other, the rotation cap 200 may be rotated without interfering with the stopper 300. That is, the rotation cap 200 is moved to the closed position thereof so that the housing internal space 105 of the locking housing 100 is not exposed to the outside. The first position of the rotation cap 200 may be corresponded to the closed position of the rotation cap which is a position blocking the housing internal space of the locking housing. Here, the rotation cap 200 may be moved to the closed position thereof by elastic force of the second spring 280. When the rotation cap 200 is moved to the closed position and the user releases operation of the lever, the stopper 300 may be rotatably moved on the curved surface 210 of the rotation cap 200. The stopper 300 may be configured to be moved inward within the guide and rest on the rotation cap 200 assuming the first position after the pulling of the cable is released. When the seatback 50 is unlocked from the hook bracket 5, the rotation cap 200 may prevent the housing internal space 105 of the locking housing 100 from being exposed to the outside. The rotation cap 200 is engaged with the second housing 130 of the locking housing 100 so as to prevent external foreign substances from flowing into the locking housing 100.

According to the embodiment of the present disclosure, even if the seatback is folded by the second spring 280 configured to move the rotation cap 200 to the closed position, the housing internal space 105 of the locking housing 100 may be blocked by the rotation cap 200, thereby preventing foreign substances from flowing into the seatback locking device 10.

Figure 9:
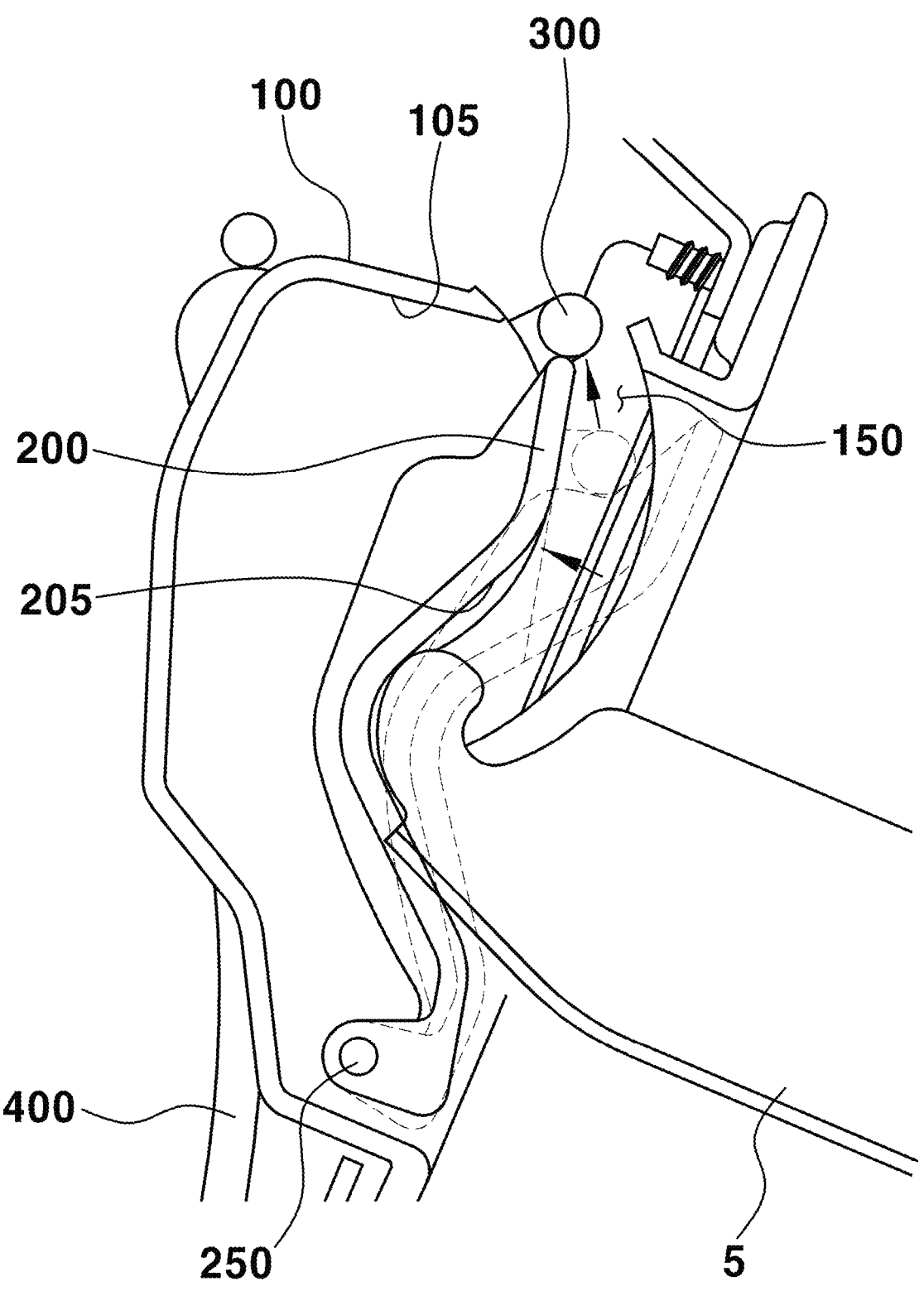
FIG. 9 is a view showing a state in which the seatback locking device according to the embodiment of the present disclosure is connected to the hook bracket installed on the vehicle body by unfolding of the seatback.

FIG. 9 is a view showing a state in which the seatback locking device according to the embodiment of the present disclosure is connected to the hook bracket installed on the vehicle body by unfolding of the seatback.

Referring to FIGS. 1 and 9, when the seatback 50 is folded, the seatback locking device 10 and the hook bracket 5 may not be coupled to each other. In this case, the stopper 300 may be located on the curved surface 210 of the rotation cap 200. When the user unfolds the seatback 50, the hook bracket 5 may be inserted into the cap internal space 205 of the rotation cap 200 so as to push the rotation cap 200. When the rotation cap 200 is rotated toward the locking housing 100, the rotation cap 200 may push the stopper 300 toward the upper portion of the guide 150. In other words, the rotation cap 200 may be rotated when contacting the hook bracket 5, and the stopper 300 may be rotated by rotation of the rotation cap 200.

Figure 10:
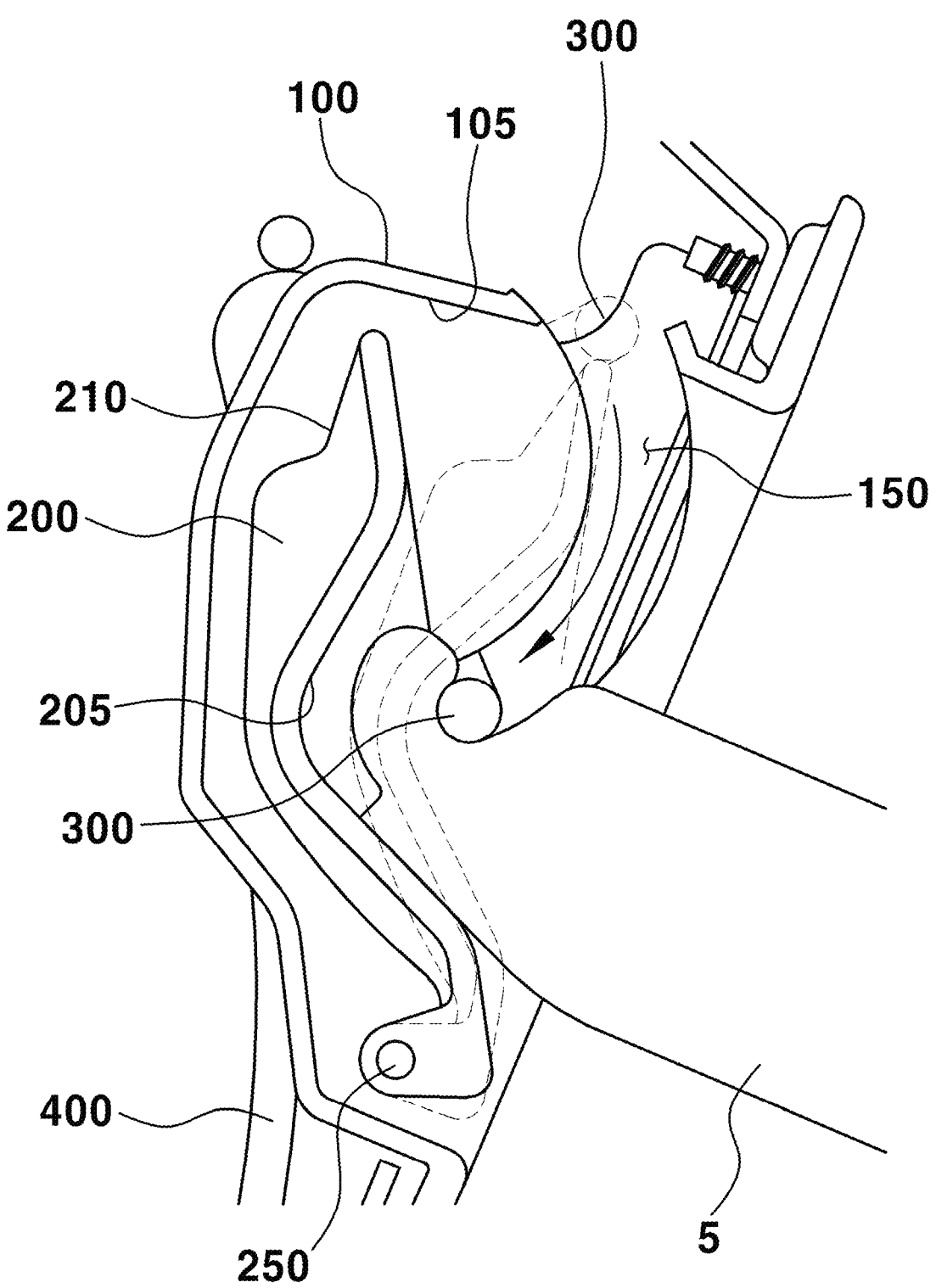
FIG. 10 is a view showing a state in which a stopper and the hook bracket are coupled to each other when the seatback locking device according to the embodiment of the present disclosure contacts the hook bracket.

FIG. 10 is a view showing a state in which the stopper and the hook bracket are coupled to each other when the seatback locking device according to the embodiment of the present disclosure contacts the hook bracket.

Referring to FIGS. 1, 9, and 10, the stopper 300 may be moved to the upper portion of the guide 150 where the stopper 300 does not interfere with the rotation cap 200. When the rotation cap 200 is rotated while passing over the stopper 300, the stopper 300 does not receive pressure from the rotation cap 200 and may be rotated toward the lower portion of the guide 150. When the stopper 300 is moved toward the lower portion of the guide 150, the stopper 300 may contact the hook bracket 5. A state in which the stopper 300 is coupled to the hook bracket 5 may mean that the seatback locking device 10 is locked to the vehicle body.

According to the embodiment of the present disclosure, regardless of the position of the seat cushion 80, when the seatback locking device 10 installed in the seatback 50 and the hook bracket 5 installed on the vehicle body contact each other, locking between the seatback 50 and the vehicle body may be performed by the seatback locking device 10. That is, in a state in which the seat cushion 80 is moved forwards, the seatback 50 may be unfolded to enable locking between the seatback 50 and the vehicle body.

Figure 11:
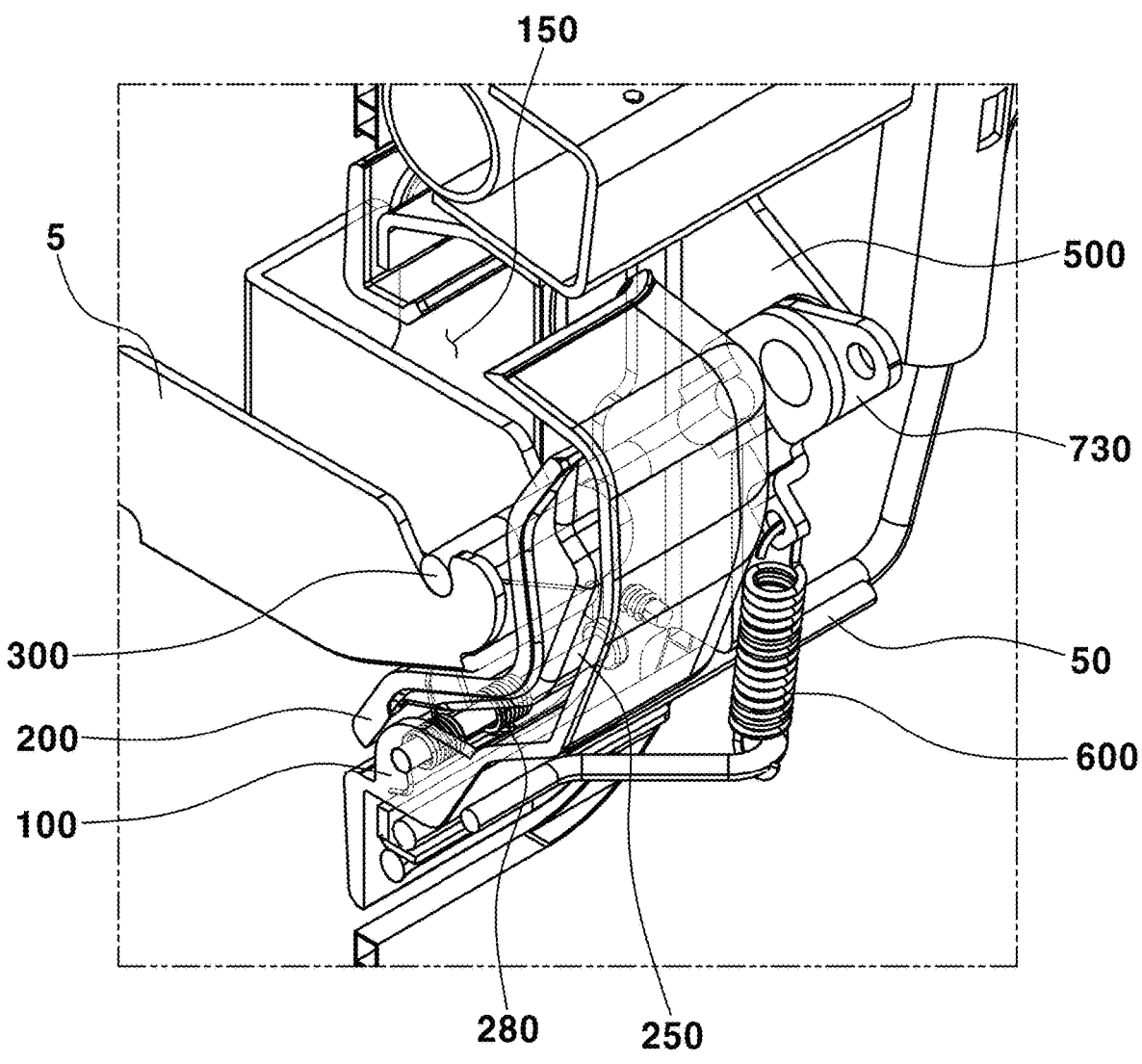
FIGS. 11 and 12 are views each showing a state in which the seatback locking device according to the embodiment of the present disclosure maintains a locked state thereof.
Figure 12:
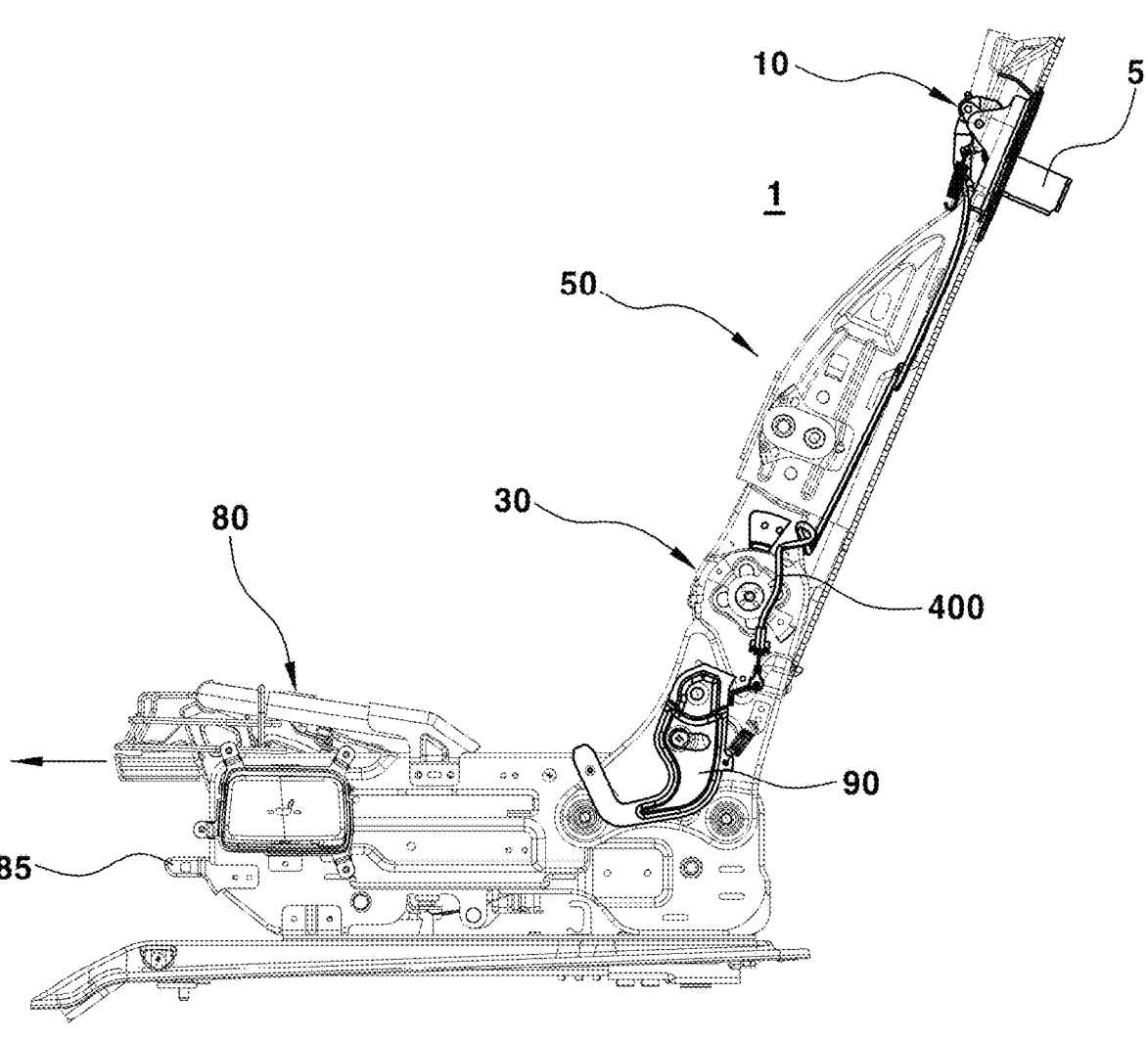

FIGS. 11 and 12 are views each showing a state in which the seatback locking device according to the embodiment of the present disclosure maintains a locked state thereof.

Referring to FIGS. 11 and 12, the seat cushion 80 may slide in a state in which the seatback 50 is fixed to the hook bracket 5. When the user operates a sliding lever 85, the seat cushion 80 may be moved forwards relative to the arrangement position of the seat 1. When the seat cushion 80 slides, the seatback 50 fixed to the hook bracket 5 may be reclined in conjunction with a reclining hinge 30.

In a state in which the seat cushion 80 slides forwards, when the user does not operate the seatback locking device 10, locking between the seatback locking device 10 and the hook bracket 5 may be maintained. The first spring 600 may pull the second sub-bracket 730 downwards relative to the arrangement direction of the seat 1. In this case, the second sub-bracket 730 may not be rotated by the first spring 600, and the position of the second sub-bracket 730 may be fixed. When the position of the second sub-bracket 730 is fixed, the stopper 300 connected to the second sub-bracket 730 may not be rotated. Accordingly, coupling between the stopper 300 and the hook bracket 5 may be maintained.

According to the embodiment of the present disclosure, the first spring 600 restricts rotation of the stopper 300 or the second sub-bracket 730 connected to the stopper 300. Accordingly, when the seatback locking device 10 and the vehicle body are coupled to each other, locking between the seatback locking device 10 and the vehicle body may be stably maintained regardless of a change in the angle of the seatback 50 or sliding of the seat cushion 80.

As is apparent from the above description, the present disclosure provides the following effects.

First, when a user operates a lever, a stopper connected to a vehicle body is rotated to release locking between a seatback locking device and the vehicle body. Accordingly, locking and unlocking between the seatback locking device and the vehicle body may be implemented using simplified components.

Second, the seatback locking device includes a first spring configured to fix, to a lower portion of a guide, the position of the stopper to be locked to the vehicle body or unlocked therefrom. Accordingly, it is possible to maintain, when the seatback locking device and the vehicle body are coupled to each other, locking between the seatback locking device and the vehicle body regardless of an angle of a seatback or sliding of a seat cushion.

Third, when the seatback is unlocked from a hook bracket, a rotation cap may prevent a housing internal space of a locking housing from being exposed to the outside. The rotation cap is engaged with a second housing of the locking housing so as to prevent external foreign substances from flowing into the locking housing.

Fourth, regardless of the position of the seat cushion, when the seatback locking device installed in the seatback and the hook bracket installed on the vehicle body contact each other, it is possible to perform locking between the seatback and the vehicle body using the seatback locking device.

While various embodiments of the present disclosure have been described with reference to the accompanying drawings, it will be appreciated by those skilled in the art that changes may be made in these embodiments without departing from the principles and spirit of the disclosure, the scope of which is defined in the appended claims and equivalents thereto. Therefore, the embodiments described above should be understood as illustrative in all respects and should not be considered limiting.

What is claimed is:

1. A seatback locking device comprising:
a locking housing coupled to a seatback, the locking housing having one open side defined as a housing internal space;
a rotation cap inserted into the housing internal space and rotatably coupled to the locking housing, the rotation cap being capable of assuming a first position and a second position depending on rotation;
a stopper configured to be movable along a guide defined in the locking housing so as to be locked to or unlocked from a hook bracket disposed on a vehicle body, the stopper configured to contact the rotation cap when the rotation cap is at the first position and to contact the hook bracket when the rotation cap is in the second position; and
a cable connected to one end of the stopper so as to move the stopper,
wherein the stopper is configured to be rotated about an axis extending between both ends of the stopper by movement of the cable or rotation of the rotation cap so as to contact the hook bracket or the rotation cap.

2. The seatback locking device of claim 1, wherein the both ends of the stopper are rotatably connected to the locking housing or a main bracket disposed on the locking housing.

3. The seatback locking device of claim 2, wherein:
the stopper is divided into a first region inserted into the guide and a second region located outside the guide; and
the stopper has a curved shape connecting the first region and the second region.

4. The seatback locking device of claim 1, wherein, when the seatback is fixed to the vehicle body, the hook bracket is coupled to the stopper in a state of being inserted into a cap internal space of the rotation cap assuming the second position, the cap internal space defined by a convex shape of the rotation cap protruding toward the locking housing.

5. The seatback locking device of claim 4, wherein:
in the second position of the rotation cap, the rotation cap is located between the locking housing and the stopper located within the guide, and is disposed spaced apart from the stopper.

6. The seatback locking device of claim 1, wherein:
the stopper is configured to be moved outward within the guide and become unlocked from the hook bracket by pulling the cable,
the hook bracket is configured to be moved away from the rotation cap when the seatback is folded, thereby allowing the rotation cap to be rotatably moved to the first position, and the first position corresponds to a closed position of the rotation cap which is a position blocking the housing internal space of the locking housing.

7. The seatback locking device of claim 6, wherein the stopper is configured to be moved inward within the guide and rest on the rotation cap assuming the first position after the pulling of the cable is released.

8. The seatback locking device of claim 1, wherein a part of the stopper located within the guide is configured to rest on the rotation cap assuming the first position in a folded state of the seatback.

9. The seatback locking device of claim 8, wherein, when the hook bracket is inserted into a cap internal space of the rotation cap by unfolding of the seatback, the rotation cap is configured to be rotated by the hook bracket so as to move the stopper outward within the guide, the cap internal space defined by a convex shape of the rotation cap protruding toward the locking housing.

10. The seatback locking device of claim 9, wherein:
the stopper rotated by the rotation cap is configured to be moved to an upper portion of the guide, and
the stopper is configured to pass over the rotation cap and to contact the hook bracket, thereby fixing the seatback to the vehicle body.

11. The seatback locking device of claim 1, wherein:
the stopper is biased by a first spring to maintain a position in which the stopper and the hook bracket are coupled, the first spring being connected to the stopper and configured to pull the stopper inward within the guide.

12. The seatback locking device of claim 11, wherein the other end of the cable is opposite the one end and is connected to the first spring.

13. The seatback locking device of claim 1, wherein:
the rotation cap and the locking housing are connected to each other by a rotation pin,
the rotation pin is connected to a second spring at an outer side thereof and configured to maintain the first position of the rotation cap, and
the rotation cap is configured to block the housing internal space of the locking housing at the first position.

14. The seatback locking device of claim 1, wherein: the rotation cap includes a lower end connected to a lower end of the locking housing, the stopper located within the guide is configured to be moved outward within the guide by pulling of the cable, and each of the lower end of the rotation cap and the lower end of the locking housing corresponds to a portion near the seat cushion.

15. The seatback locking device of claim 1, wherein the stopper and the hook bracket are configured to remain in a locked state even if the seat cushion slides.

16. The seatback locking device of claim 1, wherein:
the locking housing comprises a first housing and a second housing, the first housing defines the housing internal space, the second housing is connected to the first housing and has a flat plate structure partially open to expose the housing internal space, and
the rotation cap is configured to block the housing internal space exposed by the second housing in an unlocked state between the stopper and the hook bracket.

* * * * *